(12) United States Patent
Kong et al.

(10) Patent No.: US 12,148,963 B2
(45) Date of Patent: Nov. 19, 2024

(54) MEMBRANE-ELECTRODE ASSEMBLY, METHOD FOR MANUFACTURING SAME, AND FUEL CELL COMPRISING SAME

(71) Applicant: KOLON INDUSTRIES, INC., Seoul (KR)

(72) Inventors: Nak Won Kong, Seoul (KR); Kyoung Sik Nam, Seoul (KR); Kah Young Song, Seoul (KR); Jun Young Kim, Seoul (KR); Ju Sung Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 289 days.

(21) Appl. No.: 17/775,268

(22) PCT Filed: Dec. 23, 2020

(86) PCT No.: PCT/KR2020/019004
§ 371 (c)(1),
(2) Date: May 6, 2022

(87) PCT Pub. No.: WO2021/137518
PCT Pub. Date: Jul. 8, 2021

(65) Prior Publication Data
US 2022/0393212 A1 Dec. 8, 2022

(30) Foreign Application Priority Data
Dec. 31, 2019 (KR) .................. 10-2019-0179675

(51) Int. Cl.
*H01M 8/1006* (2016.01)
*H01M 4/88* (2006.01)
(Continued)

(52) U.S. Cl.
CPC ....... *H01M 8/1006* (2013.01); *H01M 4/8882* (2013.01); *H01M 8/1018* (2013.01); *H01M 4/8892* (2013.01); *H01M 2008/1095* (2013.01)

(58) Field of Classification Search
CPC ............. H01M 4/8882; H01M 8/1018; H01M 8/1006; H01M 4/8892
See application file for complete search history.

(56) References Cited

FOREIGN PATENT DOCUMENTS

| JP | H03167752 A | 7/1991 |
|---|---|---|
| JP | 2001003446 A | 1/2001 |

(Continued)

OTHER PUBLICATIONS

The office action dated Jun. 2, 2023 related to the corresponding Japanese Patent application.

*Primary Examiner* — Sarah A. Slifka
(74) *Attorney, Agent, or Firm* — Harvest IP Law, LLP

(57) ABSTRACT

Disclosed is a membrane-electrode assembly having increased active area, improved fluid management capability, and decreased gas transfer resistance due to electrodes having patterned structures on both sides. Also disclosed are a method for manufacturing same, and a fuel cell comprising same. A membrane-electrode assembly according to the present invention comprises: a first electrode; a second electrode; and a polymer electrolyte membrane between the first and second electrodes, wherein the first electrode has a first surface facing the polymer electrolyte membrane and a second surface opposite the first surface, the first surface having a first patterned structure, and the second surface having a second patterned structure.

16 Claims, 6 Drawing Sheets

(51) Int. Cl.
*H01M 8/10* (2016.01)
*H01M 8/1018* (2016.01)

(56) References Cited

FOREIGN PATENT DOCUMENTS

| | | | |
|---|---|---|---|
| JP | 2005174565 | A | 6/2005 |
| JP | 2006310166 | A | 11/2006 |
| JP | 2007123146 | A | 5/2007 |
| JP | 2007141588 | A | 6/2007 |
| JP | 2009170271 | A | 7/2009 |
| JP | 2012059615 | A | 3/2012 |
| JP | 2012199091 | A | 10/2012 |
| JP | 2015220052 | A | 12/2015 |
| KR | 20120032331 | A | 4/2012 |
| KR | 20140146012 | A | 12/2014 |
| KR | 20190052435 | A | 5/2019 |
| KR | 20190079137 | A | 7/2019 |
| WO | 2018042975 | A1 | 3/2018 |

MEMBRANE-ELECTRODE ASSEMBLY, METHOD FOR MANUFACTURING SAME, AND FUEL CELL COMPRISING SAME

CROSS REFERENCE TO RELATED APPLICATIONS

This application is a National Stage of International Application No. PCT/KR2020/019004 filed Dec. 23, 2020, claiming priority based on Korean Patent Application No. 10-2019-0179675 filed Dec. 31, 2019, the disclosures of which are incorporated herein by reference in their entireties.

TECHNICAL FIELD

The present disclosure relates to a membrane-electrode assembly, a method of manufacturing the same, and a fuel cell including the same, and more particularly to a membrane-electrode assembly having an increased active area, improved fluid management ability, and reduced gas transport resistance due to a double-sided patterned electrode, a method of manufacturing the same, and a fuel cell including the same.

BACKGROUND ART

A polymer electrolyte membrane fuel cell (PEMFC), which is configured to generate electricity using a structure in which unit cells, each of which includes a membrane-electrode assembly (MEA) and a separator (also referred to as a bipolar plate), are stacked, has attracted attention as a next-generation energy source capable of replacing fossil fuels due to high energy efficiency and environmentally friendly characteristics thereof.

The membrane-electrode assembly generally includes an anode (also referred to as a fuel electrode), a cathode (also referred to as an air electrode), and a polymer electrolyte membrane (PEM) therebetween.

When fuel such as hydrogen gas is supplied to the anode, hydrogen ions ($H^+$) and electrons ($e^-$) are generated at the anode as the result of hydrogen oxidation reaction. The generated hydrogen ions are transported to the cathode via the polymer electrolyte membrane (PEM), and the generated electrons are transported to the cathode via an external circuit. Oxygen in air supplied to the cathode is bonded with the hydrogen ions and the electrons, and water is generated as the result of reduction.

Since each of an electrode and a polymer electrolyte membrane (PEM) of a general membrane-electrode assembly has a smooth surface, the active area of each of the electrode and the polymer electrolyte membrane is substantially equal to the projected area of the electrode. In order to increase the active area of each of the electrode and the polymer electrolyte membrane, therefore, the size of the electrode must be increased, which causes a cost increase.

In addition, when a separator including a flow channel part that functions as a fluid path (i.e. a groove) and the other part, i.e. a non-channel part, is pressure-fastened to the membrane-electrode assembly, the portion of the electrode corresponding to the non-channel part is compressed, whereby movement of a fluid (e.g. oxygen, hydrogen, or water) is disturbed.

In particular, oxygen that must be reduced at the cathode is merely about 20% of air supplied to the cathode, and water generated as the result of oxygen reduction reaction disturbs the spread of oxygen in the cathode. For the cathode, therefore, it is particularly required to increase an active area, to achieve smooth discharge of water, and to reduce oxygen transport resistance.

In order to increase the active area of each of the electrode and the polymer electrolyte membrane, forming unevenness on the surface of the polymer electrolyte membrane has been proposed. However, this method has a problem in that it is impossible to use a decal transfer method, which is a general electrode forming method, and it is required to directly coat the polymer electrolyte membrane with a catalyst dispersion. Furthermore, if a catalyst dispersion state of the catalyst dispersion directly coated on the polymer electrolyte membrane is poor, the catalyst cannot permeate into patterned grooves of the polymer electrolyte membrane, whereby interfacial resistance between the electrode and the polymer electrolyte membrane is increased.

Meanwhile, in order to minimize oxygen transport resistance of the cathode, forming a cathode constituted by a plurality of sub-electrodes spaced apart from each other has been proposed. However, exposure of the electrolyte membrane between the sub-electrodes causes loss in active area and deterioration in durability of the membrane-electrode assembly.

DISCLOSURE

Technical Problem

Therefore, the present disclosure relates to a membrane-electrode assembly capable of preventing problems caused by limitations and shortcomings of the related art described above, a method of manufacturing the same, and a fuel cell including the same.

It is an object of the present disclosure to provide a membrane-electrode assembly having an increased active area, improved fluid management ability, and reduced gas transport resistance due to a double-sided patterned electrode.

It is another object of the present disclosure to provide a method of manufacturing a membrane-electrode assembly having an increased active area, improved fluid management ability, and reduced gas transport resistance due to a double-sided patterned electrode.

It is a further object of the present disclosure to provide a fuel cell having excellent performance and high durability.

In addition to the above objects, other features and advantages of the present disclosure will be described hereinafter, or will be clearly understood by those skilled in the art to which the present disclosure pertains from the following description thereof.

Technical Solution

In accordance with an aspect of the present disclosure, there is provided a membrane-electrode assembly including a first electrode, a second electrode, and a polymer electrolyte membrane between the first and second electrodes, wherein the first electrode has a first surface that faces the polymer electrolyte membrane and a second surface opposite the first surface, the first surface has a first patterned structure, and the second surface has a second patterned structure.

The first electrode may include an intermediate layer between the first and second patterned structures, and the thickness of the intermediate layer may be 10 to 90% of the thickness of the first electrode.

The first patterned structure may be different from the second patterned structure.

At least one of the first and second patterned structures may have a plurality of projected parts scattered over the entire region of the first or second surface.

Each of the projected parts may have a height of 1 to 50 µm, and a circle circumscribed about the base plane of each of the projected parts may have a diameter of 10 to 1000 µm.

The first patterned structure may have the projected parts.

At least one of the first and second patterned structures may include at least one projected pattern extending in a direction parallel to the first and second surfaces and a recessed pattern adjoining the projected pattern.

The projected pattern may have a height of 1 to 50 µm and a width of 10 to 1000 µm.

At least one of the first and second patterned structures may include a plurality of the projected patterns arranged parallel to each other.

The projected pattern may have a zigzag shape.

The first electrode may be a cathode, and the second electrode may be an anode.

In accordance with another aspect of the present disclosure, there is provided a method for manufacturing a membrane-electrode assembly, the method including applying a catalyst dispersion to a first release film having a first recessed pattern, covering the applied catalyst dispersion with a second release film having a second recessed pattern or a plurality of holes, drying at least the surface of the catalyst dispersion to form an electrode, removing the second release film, transferring the electrode to a polymer electrolyte membrane, and removing the first release film.

The first recessed pattern may include at least one groove extending in a direction parallel to the surface of the first release film, and the groove may have a depth of 1 to 50 µm.

The second recessed pattern may be different from the first recessed pattern.

The second release film may have the plurality of holes.

The second release film may have a thickness of 10 to 100 µm, and each of the holes may have a diameter of 10 to 1000 µm.

The method may further include drying the electrode immediately after removing the second release film.

In accordance with a further aspect of the present disclosure, there is provided a fuel cell including the membrane-electrode assembly and a separator disposed on the second patterned structure of the first electrode, wherein the second patterned structure includes at least one projected pattern extending in a direction parallel to the first and second surfaces and a recessed pattern adjoining the projected pattern, the separator has a third surface that faces the membrane-electrode assembly and a fourth surface opposite the third surface, the third surface includes a groove-shaped channel part functioning as a fluid path and a non-channel part, and the membrane-electrode assembly and the separator are aligned such that the non-channel part corresponds to the recessed pattern.

The projected pattern of the second patterned structure may have an identical shape to the channel part.

The projected pattern of the second patterned structure may have a width not greater than the width of the channel part.

The general description of the present disclosure given above is provided merely to illustrate or describe the present disclosure, and does not limit the scope of rights of the present disclosure.

Advantageous Effects

According to the present disclosure, an electrode is configured such that the surface of the electrode that contacts a polymer electrolyte membrane has a patterned structure and the opposite surface of the electrode also has a patterned structure, whereby it is possible to increase the active area of each of the polymer electrolyte membrane and the electrode. That is, a membrane-electrode assembly according to the present disclosure may have an increased active area and improved fluid management ability due to a double-sided patterned electrode, and a fuel cell according to the present disclosure may have excellent performance and high durability.

In addition, the electrode according to the present disclosure may be formed using a decal transfer method, which is a general electrode forming method, which is advantageous to mass production.

In particular, since opposite surfaces of a cathode have patterned structures, it is possible to minimize oxygen transport resistance in the cathode and to improve water management ability in the cathode.

DESCRIPTION OF DRAWINGS

The accompanying drawings, which are included to assist in understanding of the present disclosure and are incorporated in and constitute a part of the present specification, illustrate embodiments of the present disclosure and serve to explain the principle of the present disclosure together with the detailed description of the present disclosure.

BEST MODE

Hereinafter, embodiments of the present disclosure will be described in detail with reference to the accompanying drawings. However, the following embodiments are illustratively provided merely for clear understanding of the present disclosure and do not limit the scope of the present disclosure.

Figure 1:
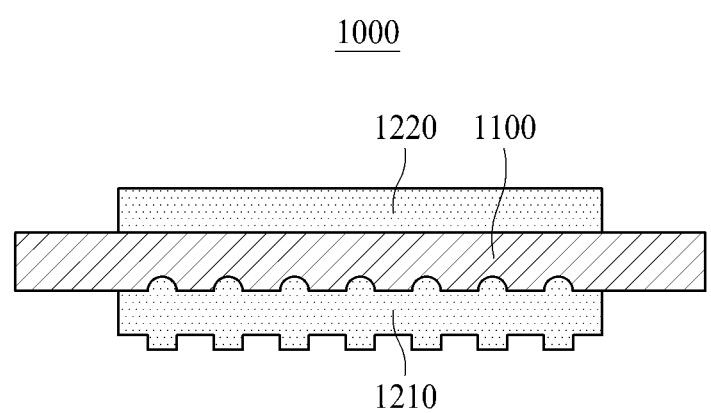
FIG. 1 schematically shows the section of a membrane-electrode assembly according to an embodiment of the present disclosure.
Figure 2:
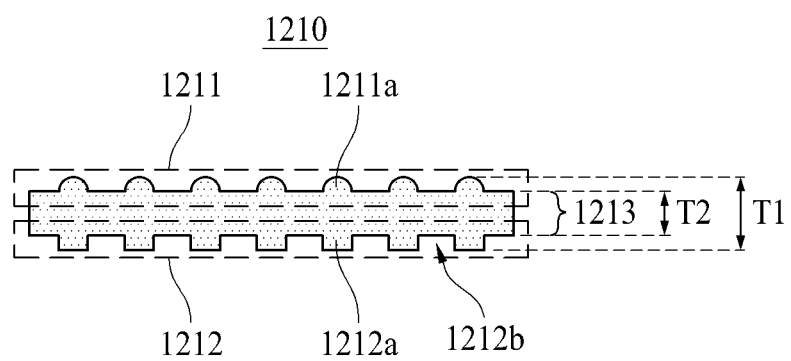
FIG. 2 schematically shows the section of a double-sided patterned electrode according to an embodiment of the present disclosure.

FIG. 1 schematically shows the section of a membrane-electrode assembly 1000 according to an embodiment of the present disclosure, and FIG. 2 schematically shows the section of a double-sided patterned electrode 1210 according to an embodiment of the present disclosure.

As illustrated in FIG. 1, the membrane-electrode assembly 1000 according to the present disclosure includes a first electrode 1210, a second electrode 1220, and a polymer electrolyte membrane 1100 between the first and second electrodes 1210 and 1220.

According to the present disclosure, the first electrode 1210 is a double-sided patterned electrode. In FIG. 1, a membrane-electrode assembly 1000 configured such that only the first electrode 1210 is a double-sided patterned electrode and the second electrode 1220 is a double-sided smooth electrode is illustrated. However, the present disclosure is not limited thereto. The second electrode 1220 may also be a double-sided patterned electrode, in the same manner as the first electrode 1210.

As illustrated in FIG. 2, the first electrode 1210 has a first surface, which faces the polymer electrolyte membrane 1100, and a second surface, which is opposite the first surface, the first surface has a first patterned structure 1211, and the second surface has a second patterned structure 1212.

The first patterned structure 1211 according to the present disclosure may increase the active areas of both the first electrode 1210 and the polymer electrolyte membrane 1100, whereby it is possible to improve performance of the membrane-electrode assembly 1000 and performance of a fuel cell.

The second patterned structure 1212 according to the present disclosure may reduce gas transport resistance in the first electrode 1210, whereby it is possible to improve performance of the membrane-electrode assembly 1000 and performance of the fuel cell.

In an embodiment of the present disclosure, as illustrated in FIG. 2, the first electrode 1210 may include an intermediate layer 1213 between the first and second patterned structures 1211 and 1212. The thickness T2 of the intermediate layer 1213 may be 10 to 90% of the thickness T1 of the first electrode 1210. If the percentage of the thickness T2 of the intermediate layer 1213 is less than 10%, gas supplied to the first electrode 1210 may easily pass through the first electrode 1210 and may then be transported to the second electrode 1220, whereby performance and durability of the membrane-electrode assembly 1000 may be lowered. If the percentage of the thickness T2 of the intermediate layer 1213 is greater than 90%, on the other hand, the size of patterns of the first and second patterned structures 1211 and 1212 may be excessively reduced, whereby the effect aimed at by the present disclosure may be insignificant.

In FIG. 2, a membrane-electrode assembly 1000 configured such that the first patterned structure 1211 and the second patterned structure 1212 are different from each other is illustrated. However, the present disclosure is not limited thereto. The first patterned structure 1211 and the second patterned structure 1212 may be identical to each other.

Figure 3:
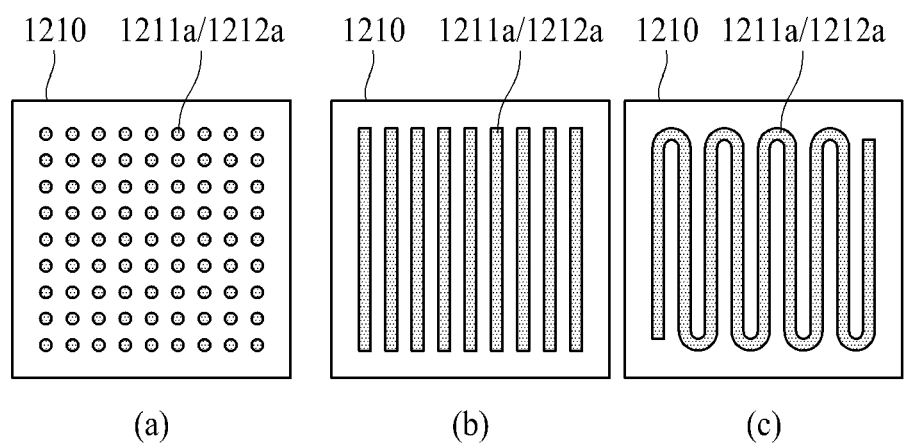
FIGS. 3(a) to 3(c) show various examples of a patterned structure according to the present disclosure.

FIGS. 3(*a*) to 3(*c*) show various examples of a patterned structure according to the present disclosure.

As illustrated in FIG. 3(*a*), at least one of the first and second patterned structures 1211 and 1212 may have a plurality of projected parts 1211*a* and 1212*a* scattered over the entire region of the first or second surface.

For example, as illustrated in FIG. 2, the first patterned structure 1211, which contacts the polymer electrolyte membrane 1100, may include a plurality of projected parts 1211*a* scattered over the entire region of the first surface of the first electrode 1210.

Each of the projected parts 1211*a* may have a height of 1 to 50 μm, and a circle circumscribed about the base plane of each of the projected parts 1211*a* may have a diameter of 10 to 1000 μm.

As illustrated in FIGS. 3(*b*) and 3(*c*), at least one of the first and second patterned structures 1211 and 1212 may include at least one projected pattern 1211*a* or 1212*a* extending in a direction parallel to the first and second surfaces and a recessed pattern adjoining the projected pattern 1211*a* or 1212*a*.

For example, the second patterned structure 1212 may include at least one projected pattern 1212*a* extending in a direction parallel to the first and second surfaces and a recessed pattern 1212*b* adjoining the projected pattern 1212*a*.

The projected pattern 1212*a* may have a height of 1 to 50 μm and a width of 10 to 1000 μm.

At least one of the first and second patterned structures 1211 and 1212 may include a plurality of projected patterns 1211*a* or 1212*a* arranged parallel to each other, as illustrated in FIG. 3(*b*), or may include a zigzag-shaped projected pattern 1211*a* or 1212*a*, as illustrated in FIG. 3(*c*).

For example, the second patterned structure 1212 may include a plurality of projected patterns 1212*a* arranged parallel to each other, or may include a zigzag-shaped projected pattern 1212*a*. In particular, it is preferable for the second patterned structure 1212, which will face a separator in a fuel cell stack, to include a projected pattern 1212*a* having a shape and a size corresponding to a flow channel of the separator, a specific reason for which will be described below.

Figure 4:
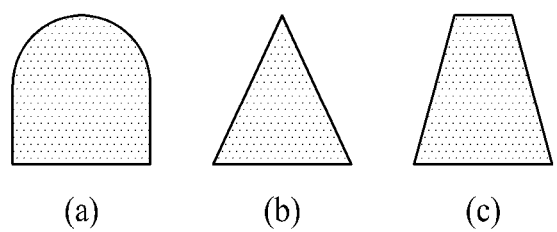
FIGS. 4(a) to 4(c) show the longitudinal sections of various examples of a projected part or a projected pattern according to the present disclosure.

FIGS. 4(*a*) to 4(*c*) show the longitudinal sections of various examples of the projected part/projected pattern 1211*a* or 1212*a* according to the present disclosure.

In FIGS. 1 and 2, the projected part/projected pattern 1211*a* or 1212*a* is illustrated as having a semicircular or rectangular longitudinal section. However, the present disclosure is not limited thereto. The projected part/projected pattern 1211*a* or 1212*a* may have an arbitrarily shaped longitudinal section. For example, the longitudinal section of the projected part/projected pattern 1211*a* or 1212*a* may have a partially curved shape (e.g. a shape illustrated in FIG. 4(*a*)) or arbitrary polygonal shapes (e.g. shapes illustrated in FIGS. 4(*b*) and 4(*c*)).

As previously described, oxygen that must be reduced at the cathode is merely about 20% of air supplied to the cathode, and water generated as the result of oxygen reduction reaction disturbs the spread of oxygen in the cathode. For the cathode, therefore, it is particularly required to increase an active area, to achieve smooth discharge of water, and to reduce oxygen transport resistance. In an embodiment of the present invention, therefore, the first electrode 1210, which is a double-sided patterned electrode, may be a cathode, and the second electrode 1220 may be an anode.

Hereinafter, a method for manufacturing a membrane-electrode assembly according to the present disclosure will be described in detail with reference to FIGS. 5A to 5H.

Figure 5A:
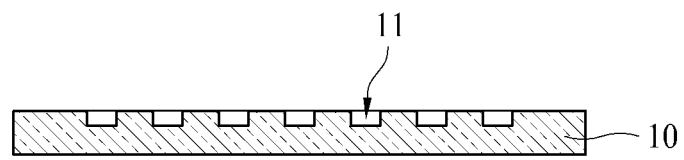
FIGS. 5A to 5H are sectional views for describing a method for manufacturing a membrane-electrode assembly according to an embodiment of the present disclosure.

First, as illustrated in FIG. 5A, a first release film 10 having a first recessed pattern 11 is prepared. The first recessed pattern 11 may include at least one groove extending in a direction parallel to a surface of the first release film 10, and the depth of the groove may be 1 to 50 μm.

Figure 5B:
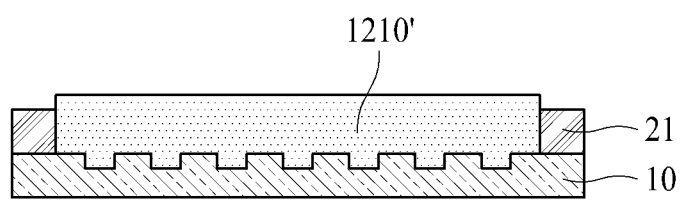

Subsequently, as illustrated in FIG. 5B, a mask film 21 is attached to the surface of the first release film 10 having the first recessed pattern 11. A first catalyst dispersion 1210' is applied to the portion of the first release film 10 exposed through an opening of the mask film 21 (i.e. the portion of the first release film in which the first recessed pattern 11 is formed). After the first catalyst dispersion 1210' is introduced into the first recessed pattern 11, a projected pattern 1212*a* of a second patterned structure 1212 is formed through a subsequent drying process.

An arbitrary catalyst dispersion that may be used to manufacture an electrode for fuel cells may be used in the present disclosure. For example, the first catalyst dispersion 1210' may include a catalyst, an ionomer, and a dispersion medium.

The catalyst may include a support and a plurality of metal particles dispersed on the support.

The support may be (i) a carbon-based support, (ii) a porous inorganic oxide support, such as zirconia, alumina, titania, silica, or ceria, or (iii) a zeolite support. The carbon-based support may be graphite, super P, carbon fiber, carbon sheet, carbon black, Ketjen black, Denka black, acetylene black, carbon nanotube (CNT), carbon sphere, carbon ribbon, fullerene, active carbon, carbon nanofiber, carbon nanowire, carbon nanoball, carbon nanohorn, carbon nanocage, carbon nanoring, ordered nano-/meso-porous carbon, carbon aerogel, mesoporous carbon, graphene, stabilized carbon, activated carbon, or a combination of two or more thereof.

The metal particles may be platinum (Pt) particles or platinum-based alloy particles. The platinum-based alloy may be Pt—Pd, Pt—Mn, Pt—Sn, Pt—Mo, Pt—W, Pt—Ru, Pt—Ru—W, Pt—Ru—Ni, Pt—Ru—Mo, Pt—Ru—Rh—Ni, Pt—Ru—Sn—W, Pt—Ru—Ir—Ni, Pt—Co, Pt—Co—Mn, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, or Pt—Cr—Ir. However, the present disclosure is not limited thereto.

The ionomer dispersed in the dispersion medium together with the catalyst is provided to transport cations, and also performs the function of a binder that increases the force of adhesion between an electrode and a polymer electrolyte membrane. The ionomer may be a fluorine-based ionomer or a hydrocarbon-based ionomer, and may have at least one ionic conductivity group selected from the group consisting of a sulfonic acid group, a carboxyl group, a boronic acid group, a phosphate group, an imide group, a sulfonimide group, a sulfonamide group, and a sulfonic acid fluoride group.

For example, the ionomer may be a fluorine-based ionomer, such as poly(perfluorosulfonic acid) or poly(perfluorocarboxylic acid).

Alternatively, the ionomer may be a hydrocarbon-based ionomer, such as sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, or sulfonated polyarylene ether sulfone ketone.

The dispersion medium may be ethanol, distilled water, isopropyl alcohol, normal propyl alcohol, butanol, or a mixture of two or more thereof. However, the present disclosure is not limited thereto.

Figure 5C:
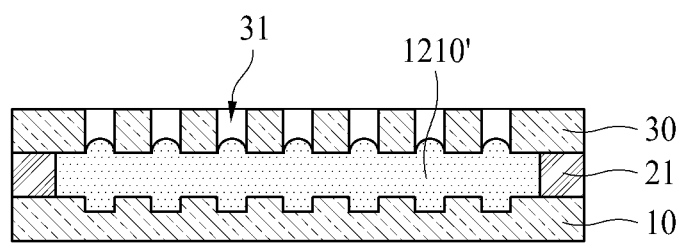

Subsequently, as illustrated in FIG. 5C, the applied first catalyst dispersion 1210' is covered with a second release film 30. The second release film 30 according to the present disclosure has a second recessed pattern or a plurality of holes.

For example, the second release film 30 may have a second recessed pattern different from the first recessed pattern 11 of the first release film 10.

Alternatively, as illustrated in FIG. 5C, the second release film 30 may have a plurality of holes 31 scattered over the entirety of a region that will contact the first catalyst dispersion 1210'. During a subsequent drying process, the dispersion medium of the first catalyst dispersion 1210' may be easily removed through the holes 31. The second release film 30 may have a thickness of 10 to 100 μm (i.e. the depth of each of the holes 31), and each of the holes 31 may have a diameter of 10 to 1000 μm. After the first catalyst dispersion 1210' is introduced into the holes 31 by capillary action, a projected part 1211a of a first patterned structure 1211 is formed through a subsequent drying process.

Figure 5D:
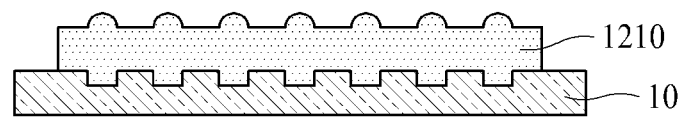

Subsequently, as illustrated in FIG. 5D, at least the surface of the first catalyst dispersion 1210' is dried to form a first electrode 1210, and the second release film 30 and the mask film 21 are removed.

Although the second release film 30 and the mask film 21 may be removed after the first catalyst dispersion 1210' is completely dried, it may be preferable that only the surface of the first catalyst dispersion 1210' be dried to such an extent that the shape of the first electrode 1210 is maintained, the second release film 30 and the mask film 21 be removed, and the first electrode 1210 be further dried to completely remove the dispersion medium therefrom in terms of efficiency of the drying process.

The first electrode 1210 formed as described above has a first patterned structure 1211, which is exposed, and a second patterned structure 1211, which contacts the first release film 10.

The first electrode 1210 may be stacked on a polymer electrolyte membrane 1100 such that the first patterned structure 1211 contacts the polymer electrolyte membrane 1100, a hot pressing process may be performed to transfer the first electrode 1210 to the polymer electrolyte membrane 1100, and the first release film 10 may be removed.

More generally, however, first and second electrodes 1210 and 1220 are simultaneously transferred to the polymer electrolyte membrane 1100.

Figure 5E:
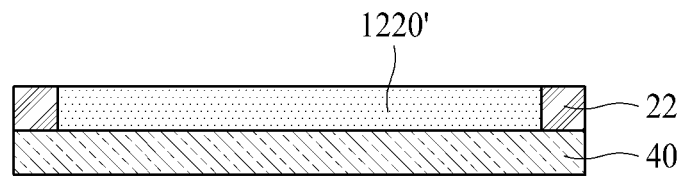

That is, as illustrated in FIG. 5E, a mask film 22 is attached to a third release film 40, and a second catalyst dispersion 1220' is applied to the portion of the third release film 40 exposed through an opening of the mask film 22. The second catalyst dispersion 1220' may be the same composition as the first catalyst dispersion 1210', and therefore a detailed description thereof will be omitted.

Figure 5F:
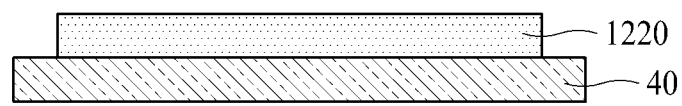

Subsequently, as illustrated in FIG. 5F, the second catalyst dispersion 1220' is completely dried to form a second electrode 1220, and the mask film 22 is removed.

Figure 5G:
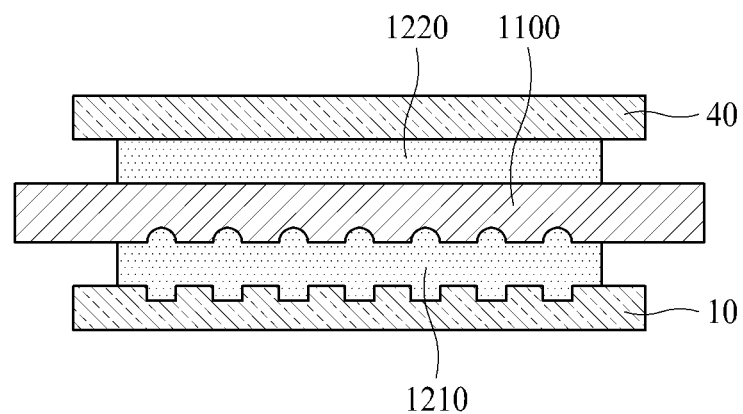

Subsequently, as illustrated in FIG. 5G, the first electrode 1210 is stacked on a first surface of the polymer electrolyte membrane 1100 such that the first patterned structure 1211 contacts the polymer electrolyte membrane 1100, and the second electrode 1220 is stacked on a second surface of the polymer electrolyte membrane 1100

The polymer electrolyte membrane 1100 may be a single membrane type electrolyte membrane formed of an ionomer or a reinforced composite membrane type electrolyte membrane including a porous support impregnated with an ionomer. In both the two types of polymer electrolyte membranes 1100, the ionomer of the first catalyst dispersion 1210' or the second catalyst dispersion 1220' may be used. It is preferable for the ionomer of the polymer electrolyte membranes 1100 and the ionomer of each of the first and second electrodes 1210 and 1220 to be of the same kind. However, the present disclosure is not limited thereto. Different kinds of ionomers may be used to manufacture the polymer electrolyte membrane 1100 and the first and second electrodes 1210 and 1220.

Figure 5H:
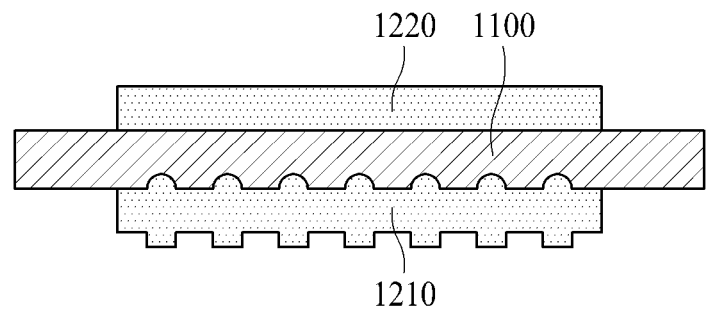

Subsequently, as illustrated in FIG. 5H, the obtained stack is thermally pressed to transfer the first and second electrodes 1210 and 1220 to the first and second surfaces of the polymer electrolyte membranes 1100, respectively, and the first and third release films 10 and 40 are removed, whereby it is possible to obtain a membrane-electrode assembly 1000 according to the present disclosure.

Hereinafter, a fuel cell according to the present disclosure will be described in detail with reference to FIG. 6.

Figure 6:
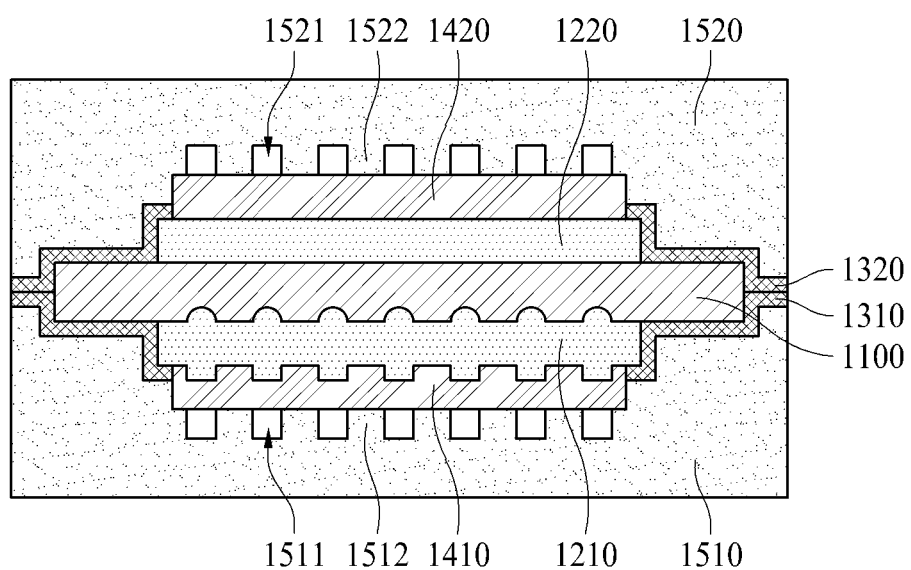
FIG. 6 schematically shows the section of a fuel cell according to an embodiment of the present disclosure.

As shown in FIG. 6, the fuel cell according to the present disclosure includes the membrane-electrode assembly 1000 according to the present disclosure described above and a first separator 1510 disposed on the second patterned structure 1212 of the first electrode 1210.

In this embodiment, the second patterned structure 1212 includes at least one projected pattern 1212a extending in a direction parallel to the first and second surfaces of the first electrode 1210 and a recessed pattern 1212b adjoining the projected pattern 1212a.

The first separator 1510 has a third surface, which faces the membrane-electrode assembly 1000, and a fourth surface, which is opposite the third surface, and the third surface includes a groove-shaped first channel part 1511, which functions as a fluid path, and a first non-channel part 1512.

As previously described, when the first separator 1510 is pressure-fastened to the membrane-electrode assembly 1000, the portion of the first electrode 1210 corresponding to the first non-channel part 1512 is compressed, whereby movement of a fluid (e.g. oxygen, hydrogen, or water) is disturbed.

According to the present disclosure, the membrane-electrode assembly 1000 and the first separator 1510 are aligned such that the first non-channel part 1512 corresponds to the recessed pattern 1212b of the second patterned structure 1212, whereby it is possible to minimize compressive deformation of the first electrode 1210 at the time of compressive fastening of the first separator 1510 and to improve fluid management ability of the membrane-electrode assembly 1000, and therefore it is possible to improve performance and durability of the fuel cell. In particular, when the first electrode 1210 is a cathode, oxygen transport resistance in the cathode may be minimized, and water management ability in the cathode may be improved.

In order to maximize the effect of the present disclosure described above, it may be preferable for the second patterned structure 1212 to include a projected pattern 1212a having a shape and a size corresponding to the first channel part 1511 of the first separator 1510. For example, the projected pattern 1212a of the second patterned structure 1212 may have the same shape as the first channel part 1511 of the first separator 1510, and the width of the projected pattern 1212a may be greater than the width of the first channel part 1511.

As illustrated in FIG. 6, the fuel cell according to the present disclosure may further include a second separator 1520 disposed on the second electrode 1220. The second separator 1520 may also include a second channel part 1521 and a second non-channel part 1522 formed at the surface thereof that faces the membrane-electrode assembly 1000.

As illustrated in FIG. 6, the fuel cell according to the present disclosure may further include a first sub-gasket 1310 disposed on the first surface of the polymer electrolyte membrane 1100 so as to surround the first electrode 1210 and a second sub-gasket 1320 disposed on the second surface of the polymer electrolyte membrane 1100 so as to surround the second electrode 1220.

The first and second sub-gaskets 1310 and 1320 (i) prevent damage to an edge portion of the polymer electrolyte membrane 1100 due to repeated swelling and contraction of the fuel cell during operation thereof, (ii) remedy poor handling of the membrane-electrode assembly 1100 due to extreme thinness of the polymer electrolyte membrane 1100, and (iii) prevent leakage of gas (i.e. hydrogen gas and air). Each of the first and second sub-gaskets 1310 and 1320 may be a film including a polyimide (PI)-based compound, a polyethylene (PE)-based compound, a polypropylene (PP)-based compound, a polyethylene terephthalate (PET)-based compound, a fluorinated ethylene propylene (FEP)-based compound, or a mixture of two or more thereof. However, the present disclosure is not limited thereto.

As illustrated in FIG. 6, the fuel cell according to the present disclosure may further include a first gas diffusion layer 1410 between the first electrode 1210 and the first separator 1510 and a second gas diffusion layer 1420 between the second electrode 1220 and the second separator 1520.

The first and second gas diffusion layers 1410 and 1420 have main functions of (i) providing gas diffusion paths from the first and second channel parts 1511 and 1521 in the first and second separators 1510 and 1520 to the first and second electrodes 1210 and 1220 such that gas (i.e. hydrogen gas and air) is easily and uniformly supplied to the first and second electrodes 1210 and 1220, (ii) allowing water, which is a byproduct of oxygen reduction reaction, to be easily removed from the first and second electrodes 1210 and 1220 therethrough, thereby preventing flooding, (iii) storing water to some extent, thereby preventing an abrupt reduction in moisture content of the polymer electrolyte membrane 1100, and (iv) providing sufficient mechanical strength to the membrane-electrode assembly 1000.

Each of the first and second gas diffusion layers 1410 and 1420 may be an electrically conductive porous member, such as carbon paper, carbon cloth, carbon felt, or metal cloth.

Hereinafter, the present disclosure will be described in detail with reference to concrete examples. However, the following examples are given merely to assist in understanding of the present disclosure, and do not limit the scope of rights of the present disclosure.

Example 1

The membrane-electrode assembly illustrated in FIG. 1 (a double-sided patterned cathode+a general anode) was manufactured using a decal transfer method according to the processes illustrated in FIGS. 5A to 5H. The cathode (0.4 $mg_{Pt}/cm^2$) and the anode (0.1 $mg_{Pt}/cm^2$) were formed using a Pt/C catalyst, and a fluorine-based polymer electrolyte membrane having a thickness of 18 μm was used.

Comparative Example 1

A general cathode and a general anode were formed on opposite surfaces of a polymer electrolyte membrane using a decal transfer method to obtain a membrane-electrode assembly. The cathode (0.4 $mg_{Pt}/cm^2$) and the anode (0.1 $mg_{Pt}/cm^2$) were formed using a Pt/C catalyst, and a fluorine-based polymer electrolyte membrane having a thickness of 18 μm was used.

Comparative Example 2

A single-sided patterned cathode and a general anode were formed on opposite surfaces of a polymer electrolyte membrane using a decal transfer method to obtain a membrane-electrode assembly. The patterned surface of the cathode was in contact with the polymer electrolyte membrane. The cathode (0.4 $mg_{Pt}/cm^2$) and the anode (0.1 $mg_{Pt}/cm^2$) were formed using a Pt/C catalyst, and a fluorine-based polymer electrolyte membrane having a thickness of 18 μm was used.

Comparative Example 3

A cathode, constituted by a plurality of sub-electrodes spaced apart from each other, and a general anode were formed on opposite surfaces of a polymer electrolyte membrane to obtain a membrane-electrode assembly. The cathode (0.4 $mg_{Pt}/cm^2$) and the anode (0.1 $mg_{Pt}/cm^2$) were formed using a Pt/C catalyst, and a fluorine-based polymer electrolyte membrane having a thickness of 18 μm was used.

[Evaluation of Power Performance]

Power performance of the membrane-electrode assembly was evaluated through I-V measurement of the membrane-electrode assembly. Specifically, in order to check power performance under actual fuel cell operating conditions, the membrane-electrode assembly was fastened to a fuel cell unit cell evaluation device, and the temperature of the membrane-electrode assembly was maintained at 65° C. Hydrogen (100% RH) and air (100% RH) were supplied respectively to the anode and the cathode in amount corresponding to Stoichiometry 1.2/2.0. Voltages when current densities of 0.1 $A/cm^2$, 1 $A/cm^2$, and 2 A/cm2 were applied were measured, and the results are shown in Table 1 below. Higher measured voltage indicates better power performance.

In addition, open circuit voltage (OCV) was measured, and the results are shown in Table 1 below.

TABLE 1

| | OCV (V) | Voltage (V) (@ 0.1 $A/cm^2$) | Voltage (V) (@ 1 $A/cm^2$) | Voltage (V) (@ 2 $A/cm^2$) |
| --- | --- | --- | --- | --- |
| Ex. 1 | 0.97 | 0.83 | 0.68 | 0.56 |
| Comp. Ex. 1 | 0.96 | 0.78 | 0.63 | 0.47 |
| Comp. Ex. 2 | 0.96 | 0.82 | 0.66 | 0.49 |
| Comp. Ex. 3 | 0.93 | 0.80 | 0.65 | 0.54 |

It can be seen that, for Comparative Example 2, the interfacial area between the cathode and the polymer electrolyte membrane was increased, whereby power performance in an activated region (current density of 0.1 $A/cm^2$) and an ohmic region (1 $A/cm^2$) was improved, compared to Comparative Example 1. It can be seen that, for Comparative Example 3, the cathode was formed using a plurality of sub-electrodes spaced apart from each other, whereby power performance in a material transport resistance region (2 $A/cm^2$) was improved, compared to Comparative Example 1. However, power performance in the other regions (i.e. current densities of 0.1 $A/cm^2$ and 1 $A/cm^2$) was not greatly different from power performance in Comparative Example 1. In addition, Comparative Example 3 exhibited lower OCV than Comparative Example 1. The reason for this is that hydrogen transmittance was increased due to exposure of the polymer electrolyte membrane between the sub-electrodes.

It can be seen that Example 1 exhibited the highest OCV due to low gas transmittance while having all the positive effects of Comparative Example 2 and Comparative Example 3.

[Cyclic Voltammetry (CV) & Linear Sweep Voltammetry (LSV)]

Electrochemical surface area (ECA) of the cathode of the membrane-electrode assembly was calculated utilizing an area value of a hydrogen adsorption and desorption region in a CV curve obtained through cyclic voltammetry (CV), and the results are shown in Table 2 below. In addition, hydrogen transmittance was indirectly checked through linear sweep voltammetry (LSV), and the results are shown in Table 2 below.

TABLE 2

| | ECA ($m^2/g$) | $H_2$ crossover ($mA/cm^2$) (@ 0.2 V) |
| --- | --- | --- |
| Example 1 | 35 | 1.72 |
| Comp. Ex. 1 | 29 | 1.7 |
| Comp. Ex. 2 | 34 | 1.75 |
| Comp. Ex. 3 | 28 | 1.91 |

It can be seen that, for Comparative Example 2, the interfacial area between the cathode and the polymer electrolyte membrane was increased, whereby electrochemical surface area (ECA) was increased, compared to Comparative Example 1, and hydrogen transmittance was increased, compared to Comparative Example 1.

It can be seen that, for Comparative Example 3, the cathode was formed using a plurality of sub-electrodes spaced apart from each other, whereby electrochemical surface area (ECA) was decreased, compared to Comparative Example 1. Furthermore, Comparative Example 3 exhibited much higher hydrogen transmittance than Comparative Example 1.

It can be seen that, for Example 1, electrochemical surface area (ECA) was the most increased, compared to Comparative Example 1, and hydrogen transmittance was only slightly increased, compared to Comparative Example 1.

The invention claimed is:

1. A membrane-electrode assembly comprising:
a first electrode;
a second electrode; and
a polymer electrolyte membrane between the first and second electrodes, wherein
the first electrode has a first surface that faces the polymer electrolyte membrane and a second surface opposite the first surface,
the first surface has a first patterned structure,
the second surface has a second patterned structure, and
the first patterned structure has a plurality of projected parts respectively having a circumscribed circle diameter of 10 to 1000 μm at a base plane thereof such that both the first electrode and the polymer electrolyte membrane have increased active areas, whereas the second patterned structure has at least one projected pattern extending in a direction parallel to the second surface and having a width of 10 to 1000 μm and a recessed pattern adjoining the projected pattern such that a non-channel part of a separator to be disposed on the second patterned structure corresponds only to the recessed pattern of the second patterned structure.

2. The membrane-electrode assembly according to claim 1, wherein
the first electrode comprises an intermediate layer between the first and second patterned structures, and
a thickness of the intermediate layer is 10 to 90% of a thickness of the first electrode.

3. The membrane-electrode assembly according to claim 1, wherein the projected parts are scattered over an entire region of the first surface.

4. The membrane-electrode assembly according to claim 1, wherein
each of the projected parts has a height of 1 to 50 µm.

5. The membrane-electrode assembly according to claim 1, wherein the projected pattern has a height of 1 to 50 µm.

6. The membrane-electrode assembly according to claim 1, wherein the second patterned structure comprises a plurality of the projected patterns arranged parallel to each other.

7. The membrane-electrode assembly according to claim 1, wherein the projected pattern has a zigzag shape.

8. The membrane-electrode assembly according to claim 1, wherein
the first electrode is a cathode, and
the second electrode is an anode.

9. A method for manufacturing a membrane-electrode assembly, the method comprising:
applying a catalyst dispersion to a first release film having a first recessed pattern;
covering the applied catalyst dispersion with a second release film having a second recessed pattern or a plurality of holes;
drying at least a surface of the catalyst dispersion to form an electrode, the electrode having a first patterned structure formed on a first surface thereof by means of the second release film and a second patterned structure formed on a second surface thereof by means of the first release film;
removing the second release film;
transferring the electrode to a polymer electrolyte membrane in such a way that the first surface of the electrode faces the polymer electrolyte membrane; and
removing the first release film,
wherein the first patterned structure has a plurality of projected parts respectively having a circumscribed circle diameter of 10 to 1000 µm at a base plane thereof such that both the electrode and the polymer electrolyte membrane have increased active areas, whereas the second patterned structure has at least one projected pattern extending in a direction parallel to the second surface and having a width of 10 to 1000 µm and a recessed pattern adjoining the projected pattern such that a non-channel part of a separator to be disposed on the second patterned structure corresponds only to the recessed pattern of the second patterned structure.

10. The method according to claim 9, wherein
the first recessed pattern comprises at least one groove extending in a direction parallel to a surface of the first release film, and
the groove has a depth of 1 to 50 µm.

11. The method according to claim 9, wherein the second release film has the plurality of holes.

12. The method according to claim 11, wherein
the second release film has a thickness of 10 to 100 µm, and
each of the holes has a diameter of 10 to 1000 µm.

13. The method according to claim 9, further comprising drying the electrode immediately after removing the second release film.

14. A fuel cell comprising:
a membrane-electrode assembly comprising: a first electrode; a second electrode; and a polymer electrolyte membrane between the first and second electrodes, wherein the first electrode has a first surface that faces the polymer electrolyte membrane and a second surface opposite the first surface, the first surface has a first patterned structure, and the second surface has a second patterned structure; and
a separator disposed on the second patterned structure of the first electrode, wherein
the second patterned structure comprises: at least one projected pattern extending in a direction parallel to the first and second surfaces and having a width of 10 to 1000 µm; and a recessed pattern adjoining the projected pattern,
the separator has a third surface that faces the membrane-electrode assembly and a fourth surface opposite the third surface,
the third surface comprises: a groove-shaped channel part functioning as a fluid path; and a non-channel part,
the first patterned structure has a plurality of projected parts respectively having a circumscribed circle diameter of 10 to 1000 µm at a base plane thereof such that both the first electrode and the polymer electrolyte membrane can have increased active areas, and
the membrane-electrode assembly and the separator are aligned such that the non-channel part of the separator corresponds only to the recessed pattern of the second patterned structure.

15. The fuel cell according to claim 14, wherein the projected pattern of the second patterned structure has an identical shape to the channel part.

16. The fuel cell according to claim 15, wherein the projected pattern of the second patterned structure has a width not greater than a width of the channel part.

* * * * *